United States Patent [19]

Kobayashi

[11] Patent Number: 5,214,510
[45] Date of Patent: May 25, 1993

[54] ADAPTIVE DIGITAL APERTURE COMPENSATION AND NOISE CANCEL CIRCUIT

[75] Inventor: Munenori Kobayashi, Tokyo, Japan

[73] Assignee: NEC Corporation, Tokyo, Japan

[21] Appl. No.: 755,281

[22] Filed: Sep. 5, 1991

[30] Foreign Application Priority Data

Sep. 7, 1990 [JP] Japan .................................. 2-237421

[51] Int. Cl.⁵ ...................... H04N 5/213; H04N 5/208
[52] U.S. Cl. ..................................... 358/167; 358/162; 358/36
[58] Field of Search .................. 358/167, 162, 166, 31, 358/36, 37

[56] References Cited

U.S. PATENT DOCUMENTS

| 4,855,829 | 8/1989 | Kihara | 358/162 |
| 4,918,528 | 4/1990 | Oohashi | 358/166 |
| 4,991,021 | 2/1991 | Nikoh | 358/162 |

FOREIGN PATENT DOCUMENTS

| 127788 | 7/1985 | Japan . |
| 127879 | 7/1985 | Japan . |
| 122771 | 5/1990 | Japan . |

Primary Examiner—James J. Groody
Assistant Examiner—Chris Grant

[57] ABSTRACT

In multiplying an absolute value of a high frequency component of an input video signal and a gain selected from an aperture compensation gain and a noise cancel gain to carry out the aperture compensation and the noise cancel of the video signal, upper or lower bits of the absolute value are selected dependent on a control selected from the aperture compensation and the noise cancel in accordance with a level of the absolute value and a level of the input video signal. In carrying out the addition and the subtraction between the input video signal and a multiplied value, upper or lower bits of the multiplied value are selected in the same manner as in the above multiplying stage. As a result, a scale of a multiplier can be small.

3 Claims, 5 Drawing Sheets

ADAPTIVE DIGITAL APERTURE COMPENSATION AND NOISE CANCEL CIRCUIT

FIELD OF THE INVENTION

This invention relates to a circuit for processing digital video signals, and more particularly to, an adaptive digital aperture compensation and noise cancel circuit used for a video camera, a VTR, a television, an electronic still camera, etc.

BACKGROUND OF THE INVENTION

One type of a conventional adaptive digital aperture compensation and noise cancel circuit carries out aperture compensation and noise cancel as a result of the comparison between a high frequency component of an input video signal and a respective one of a coring threshold value and a limiter threshold value, and between the input video signal and an input threshold value. That is, when the high frequency component of the input video signal is greater in absolute value than the coring threshold value, the aperture compensation is carried out, and, when the high frequency component is less in absolute value than the limiter threshold value, and the input video signal is less than the input threshold value, the noise cancel is carried out. On the other hand, the comparison result does not meet the above conditions, the input video signal is passed through the circuit without any signal processing.

In the high frequency component of the input video signal, generally, there is a level difference having a ratio which is greater than two times between an edge component and a noise component, so that a large level difference is set between the coring threshold value and the limiter threshold value to detect the edge and noise components. That is, the coring threshold value is set to be much greater than the limiter threshold value. Thus, an output video signal which is applied with the aperture compensation or the noise cancel is obtained at an output terminal of the circuit.

However, the conventional adaptive digital aperture compensation and noise cancel circuit has a disadvantage in that a large number of signal bits are required to provide a sufficient gradation of the noise component, because the edge and noise components are transmitted through a common signal line. As a result, a scale of a multiplier for multiplying the high frequency component and a respective one of an aperture compensation gain and a noise cancel gain becomes large.

SUMMARY OF THE INVENTION

Accordingly, it is an object of the invention to provide an adaptive digital aperture compensation and noise cancel circuit in which a small scale of a multiplier is used.

It is another object of the invention to provide an adaptive digital aperture compensation and noise cancel circuit which is realized in a semiconductor integrated circuit having a reduced area.

According to the invention, an adaptive digital aperture compensation and noise cancel circuit, comprises:

means for comparison between an absolute value of a high frequency component of an input video signal and a respective one of coring and limiter threshold values, and between the input video signal and an input threshold value;

first means for selecting a predetermined number of upper or lower bits of the absolute value in accordance with a comparison result of the comparison means;

a multiplier for multiplying a selected upper or lower bits and one selected from an aperture compensation gain and a noise cancel gain in accordance with the comparison result;

second means for selecting a predetermined number of upper or lower bits of a multiplied value of the multiplier in accordance with the comparison result;

means for carrying out a calculation selected from an addition of a selected upper or lower bits of the multiplied value to the input video signal and a subtraction of the selected upper or lower bits of the multiplied value from the input video signal in accordance with a sign of the high frequency component and the comparison result of the comparison means, an output video signal being generated by the calculation.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
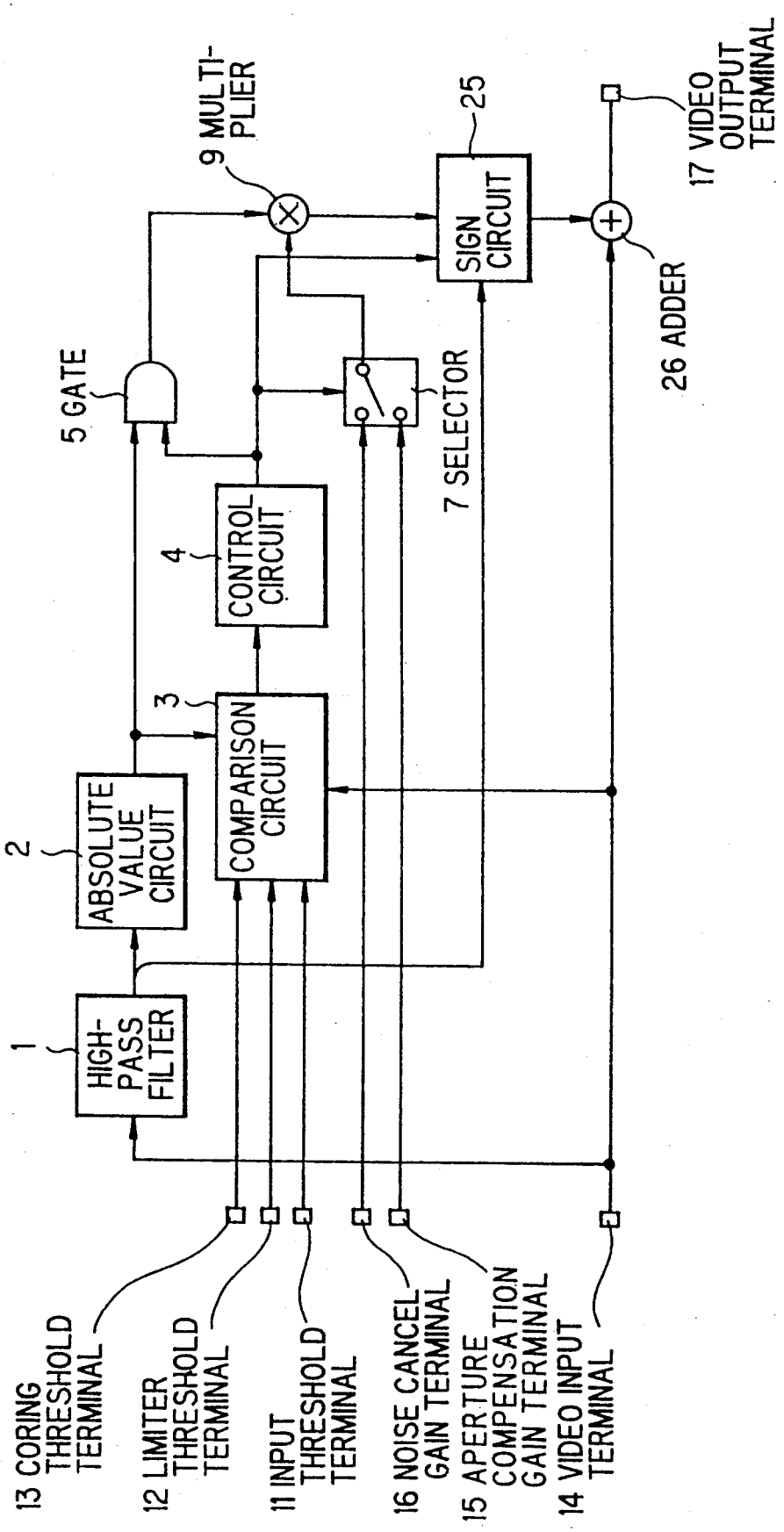
FIG. 1 is a block diagram showing a conventional adaptive digital aperture compensation and noise cancel circuit.

Before explaining an adaptive digital aperture compensation and noise cancel circuit of the invention, the conventional adaptive digital aperture compensation and noise cancel circuit will be explained in FIG. 1.

The adaptive digital aperture compensation and noise cancel circuit comprises a high-pass filter 1 connected to a video signal input terminal 14 for passing a high frequency component of an input video signal, an absolute value circuit 2 connected to an output of the high-pass filter 1 for providing an absolute value of the high frequency component, a comparison circuit 3 connected to an output of the absolute value circuit 2, to input, limiter and coring threshold value terminals 11, 12 and 13, and to the video signal input terminal 14 for carrying out predetermined comparisons (set out later), a control circuit 4 connected to the comparison circuit 3 for providing a control signal as a result of the comparisons, a gate 5 connected to outputs of the absolute value circuit 2 and to the control circuit 4 for providing one selected from an output signal of the absolute value circuit 2 and a signal of zero dependent on the control signal, a selector 7 connected to aperture compensation gain and noise cancel gain terminals 15 and 16 for selecting one of an aperture compensation gain and a noise cancel gain dependent on the control signal and holding the selected gain until a following control signal is generated, a multiplier 9 for multiplying outputs of the gate 5 and the selector 7, a sign circuit 25 connected to outputs of the multiplier 9, the control circuit 4 and the high-pass filter 1 for selecting one of a conversion and a non-conversion of a sign regarding an output signal of the multiplier 9, and an adder 26 for adding output signals of the sign circuit 25 and the input video signal to supply an added signal to an output video signal terminal 17. In this conventional adaptive digital aperture compensation and noise cancel circuit, the aforementioned comparisons are carried out in the comparison circuit 3 between the absolute value and a coring threshold value, between the absolute value and a limiter threshold value, and between the input video signal and an input threshold value. As a result of these comparisons, the control circuit 4 provides an aperture compensation control signal, when the absolute value is equal to or greater than the coring threshold value, a noise cancel control signal, when the absolute value is less than the limiter threshold value and the input video signal is less than the input threshold value, and a through control signal, when no aperture compensation control signal and no noise cancel control signal are generated.

Figure 2A:
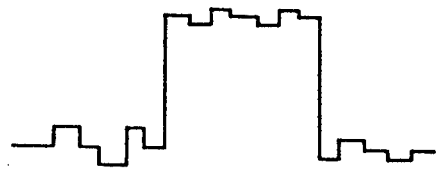
FIGS. 2A to 2D are waveforms of signals in the conventional adaptive digital aperture compensation and noise cancel circuit.
Figure 2B:
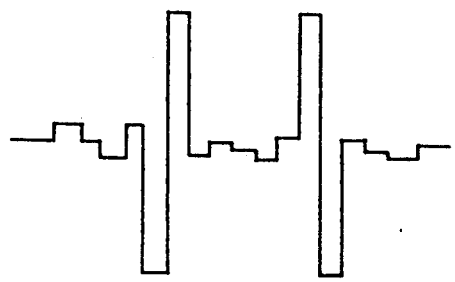
Figure 2C:
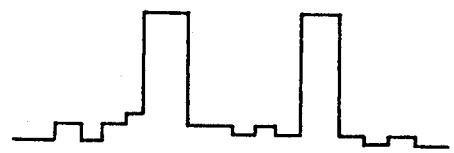
Figure 2D:
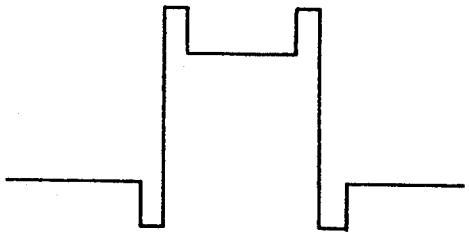

In operation, a video signal which is shown in FIG. 2A is applied to the input video signal terminal 14. A high frequency component of the video signal which is shown in FIG. 2B is passed through the high-pass filter 1, and an absolute value signal of the high frequency component which is shown in FIG. 2C is obtained in the absolute value circuit 2, The absolute value $V_A$ is compared in the comparison circuit 3 with the coring threshold value Tc and the limiter threshold value $T_L$, and the input video signal $V_{IN}$ is compared therein with the input threshold vale Ti. When $V_A$ is equal to or greater than Tc ($V_A \geq Tc$), an aperture compensation control signal is generated in the control circuit 4, when $V_A$ is less than $T_L$ ($V_A < T_L$) and $V_{IN}$ is less than Ti ($V_{IN} < Ti$), a noise cancel control signal is generated therein, and when $V_A$ and $V_{IN}$ do not meet the above conditions, a through signal is generated therein. In a case where the control circuit 4 provides the through signal, the gate 5 provides the multiplier 9 with zero, and, in a case where the control circuit 4 provides the aperture compensation or noise cancel control signal, the gate 5 provides the multiplier 9 with the absolute value $V_A$. In this latter case, the selector 7 provides the multiplier 9 with an aperture compensation gain GA, when the aperture compensation control signal is generated in the control circuit 4, and the selector 7 provides the multiplier 9 with a noise cancel gain GN, when the noise cancel control signal is generated in the control circuit 4. In the multiplier 9, the output signals of the gate 5 and the selector 7 are multiplied, so that the multiplied result is supplied to the sign circuit 25 along with a sign bit of the high frequency component which is the MSB of, for instance, 8 bit signal supplied from the high-pass filter 1 and the control signal supplied from the control circuit 4. In a case where the sign bit is plus ("0"), and the aperture compensation control signal is generated in the control circuit 4, and, in a case where the sign bit is minus ("1"), and the noise cancel control signal is generated in the control circuit 4, the multiplied value is passed through the sign circuit 25 to be supplied to the adder. On the other hand, in a case where the sign bit is plus, and the noise cancel control signal is generated in the control circuit 4, and, in a case where the sign bit is minus, and the aperture compensation control signal is generated in the control circuit 4, a sign of the multiplied value is converted in the sign circuit 25 to be supplied to the adder 26. In this circuit, a coding form of two's complement is adopted, as understood from the use of plus ("0") and minus ("1"). Then, the output signal of the sign circuit 25 and the input video signal are added in the adder 26 to be supplied as an output video signal which is shown in FIG. 2D to the output video signal terminal 17.

Figure 3:
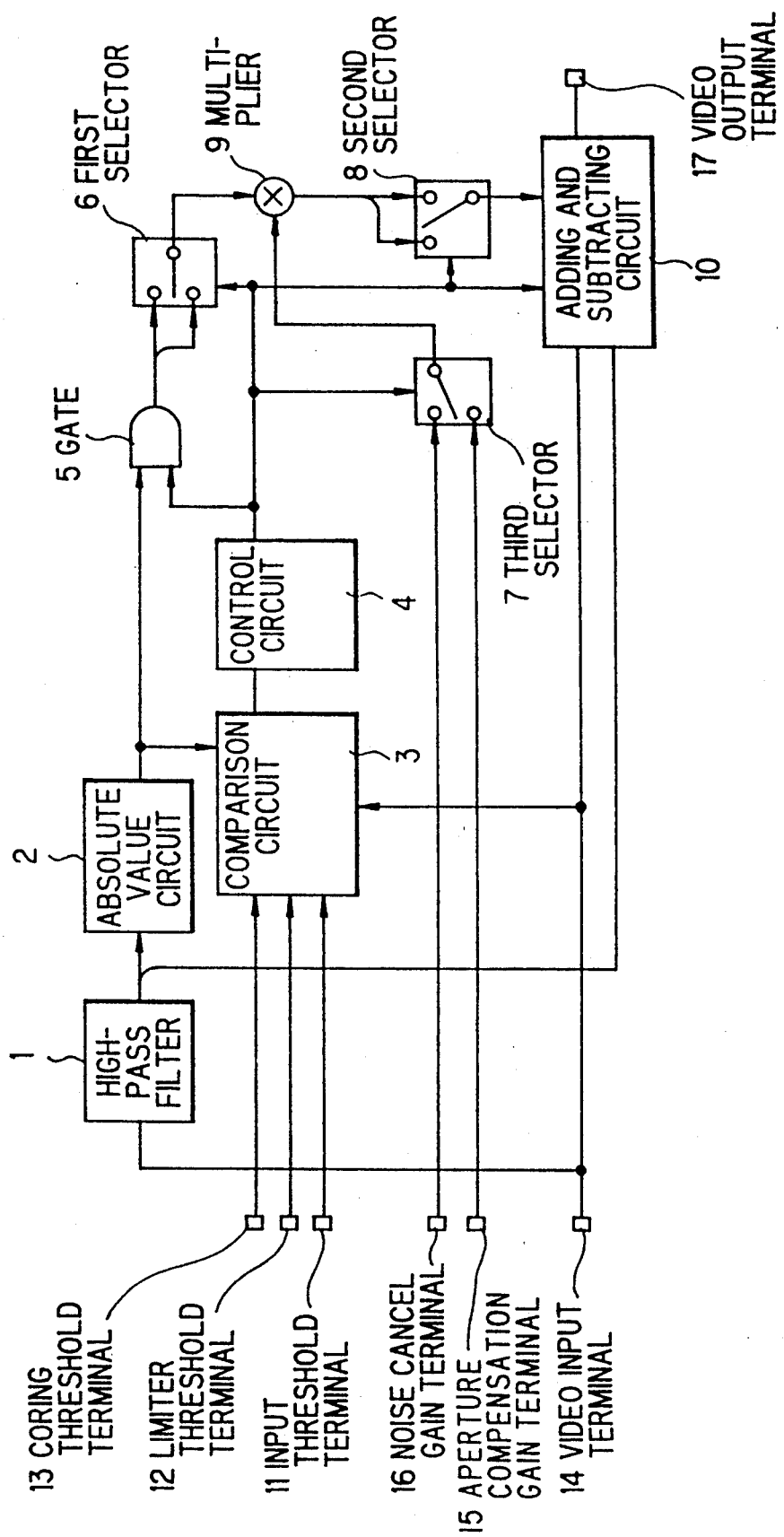
FIG. 3 is a block diagram showing an adaptive digital aperture compensation and noise cancel circuit of a first preferred embodiment according to the invention.

Next, an adaptive digital aperture compensation and noise cancel circuit of a first preferred embodiment according to the invention will be explained in FIG. 3, wherein like parts are indicated by like reference numerals as used in FIG. 1.

In this first preferred embodiment, a first selector 6, a second selector 8, and a third selector 7 are provided, and an adding and subtracting circuit 10 is further provided in addition to the structure of the conventional adaptive digital aperture compensation and noise cancel circuit, in which the sign circuit 25 and the adder 26 are replaced by the adding and subtracting circuit 10, and the selector 7 corresponds to the third selector 7.

The first selector 6 is provided with a first input, to which upper N1 (N1 is an integer) bits of an N (N is an integer larger than N1) bit output signal of the gate 5 are supplied, and a second input, to which lower N2 (N2 is an integer smaller than N) bits of the N bit output signal are supplied, and is controlled by a control signal of the control circuit 4. Here, it is assumed that N is 8, and N1 and N2 are 6, respectively. Similarly, the second selector 8 is provided with a first input, to which upper M1 bits of an M bit output signal of the multiplier 9 are applied, and a second input, to which lower M2 bits of the M bit output signal are supplied, and is controlled by the control signal. Here, M, M1 and M2 are integers to meet the relations M>M1, and M>M2, and preferably M<M1+M2.

Figure 4:
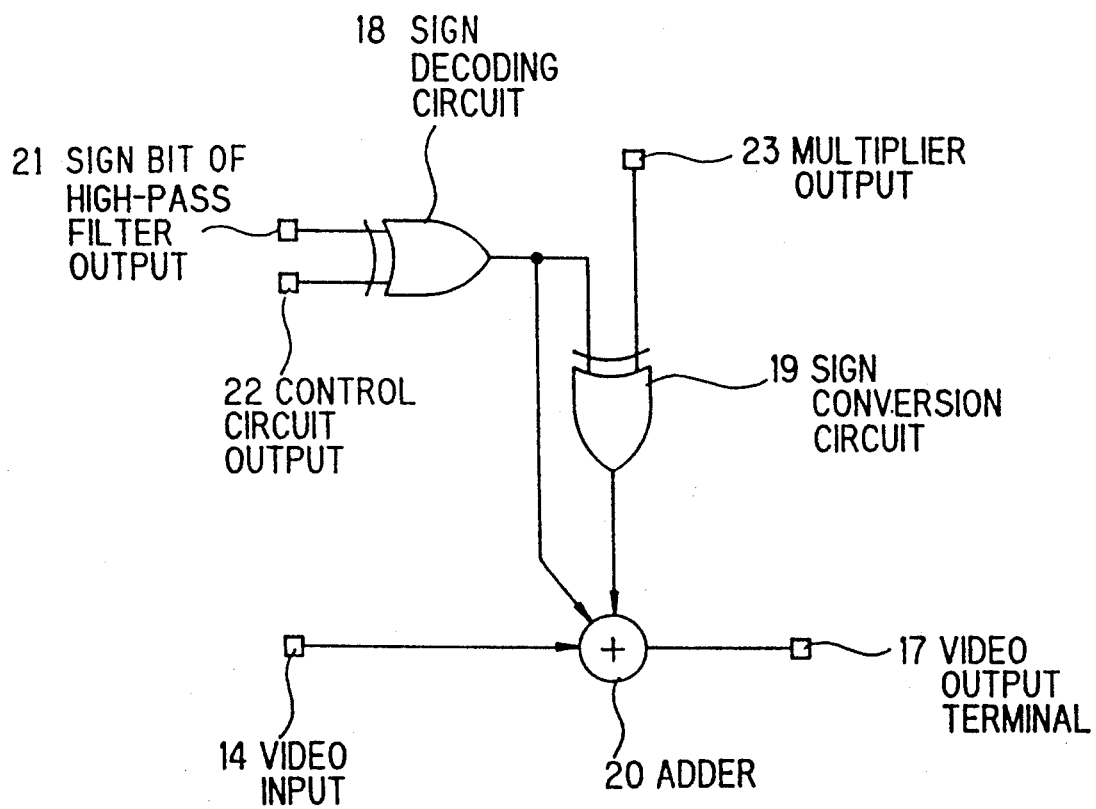
FIG. 4 is a circuit diagram showing an adding and subtracting circuit in the first preferred embodiment.

FIG. 4 shows the adding and subtracting circuit 10 which comprises a sign decoding circuit 18 having a first input terminal 21 for receiving a sign bit from the high-pass filter 1 and a second input terminal 22 for receiving a control signal from the control circuit 4, a sign conversion circuit 19 having a first input terminal 23 for receiving an output signal of the multiplier 9 and a second input terminal connected to an output of the decoding circuit 18, and an adder 20 having a carry input terminal connected to an output of the sign decoding circuit 18, two input terminals connected to the sign conversion circuit 19 and the video signal input terminal 14, and an output terminal connected to the video signal output terminal 17.

In operation, a high frequency component of an input video signal (FIG. 2A) applied to the video signal input terminal 14 is passed through the high-pass filter 1 to be supplied to the absolute value circuit 2, in which an absolute value of the high frequency component (FIG. 2B) is obtained. The absolute value $V_A$ (FIG. 2C) is compared in the comparison circuit 3 with a coring threshold value Tc and a limiter threshold value $T_L$, and the input video signal $V_{IN}$ is compared therein with an input threshold value Vi. As a result of these comparisons, an aperture compensation control signal, a noise cancel control signal and a through control signal are generated in the control circuit 4 in the same manner as in the aforementioned conventional adaptive digital aperture compensation and noise cancel circuit. When the through control signal is generated therein, the gate 5 provides zero regardless of a content of the absolute value $V_A$, and, when signals other than the through control signal are generated therein, the gate 5 provides the absolute value $V_A$. Then, the first selector 6 selects the upper N1 bits applied to the first input thereof in case of the aperture compensation control, and the lower N2 bits applied to the second input thereof in case of the noise cancel control, and holds a prior state in case of the through control. On the other hand, the third selector 7 selects an aperture compensation gain in case of the aperture compensation control, and a noise cancel gain in case of the noise cancel control, and holds a prior state in case of the through control. Thus, output signals of the first and third selectors 6 and 7 are multiplied in the multiplier 9 to supply a multiplied result to the second selector 8, in which the upper M1 bits of the multiplied result are selected in case of the aperture compensation control, the lower M2 bits thereof are selected in case of the noise cancel control, and a prior state is held in case of the through control. In the adding and subtracting circuit 10, the sign decoding circuit 18 provides "0" in a case where a sign bit supplied from the high-pass filter 1 is plus ("0"), and the aperture compensation control signal is generated in the control circuit 4, and, in a case where the sign bit is minus ("1"), and the noise cancel control signal is generated therein, while the sign decoding circuit 18 provides "1" in a case where the sign bit is plus, and the noise cancel control signal is generated in the control circuit 4, and, in a case where the sign bit is minus, and the aperture compensation control signal is generated therein. In case of situations other than the above conditions, a prior state is held in the second selector 8. Then, the sign conversion circuit 19 converts all bits of the multiplied result of the multiplier 9, when an output signal of the sign decoding circuit 18 is "1", while the multiplied result is passed through the sign conversion circuit, when the output signal is "0". Finally, an output signal of the sign conversion circuit 19 and the video signal supplied from the input terminal 14 are added in the adder 20 to be supplied as an output video signal (FIG. 2D) to the video signal output terminal 17.

As described above, the adaptive aperture compensation and noise cancel circuit can be realized in the invention, because it is determined whether a high frequency component is added to or subtracted from an original video signal in accordance with the comparison between an absolute value of the high frequency component and a respective one of coring and limiter threshold values, and between the video signal and an input threshold value. In addition, a scale of a multiplier can be small by decreasing the number of bits necessary for the multiplier, because a predetermined number of upper or lower bits are selected in the first and second selectors in accordance with the control selected from the aperture compensation and the noise cancel.

Figure 5:
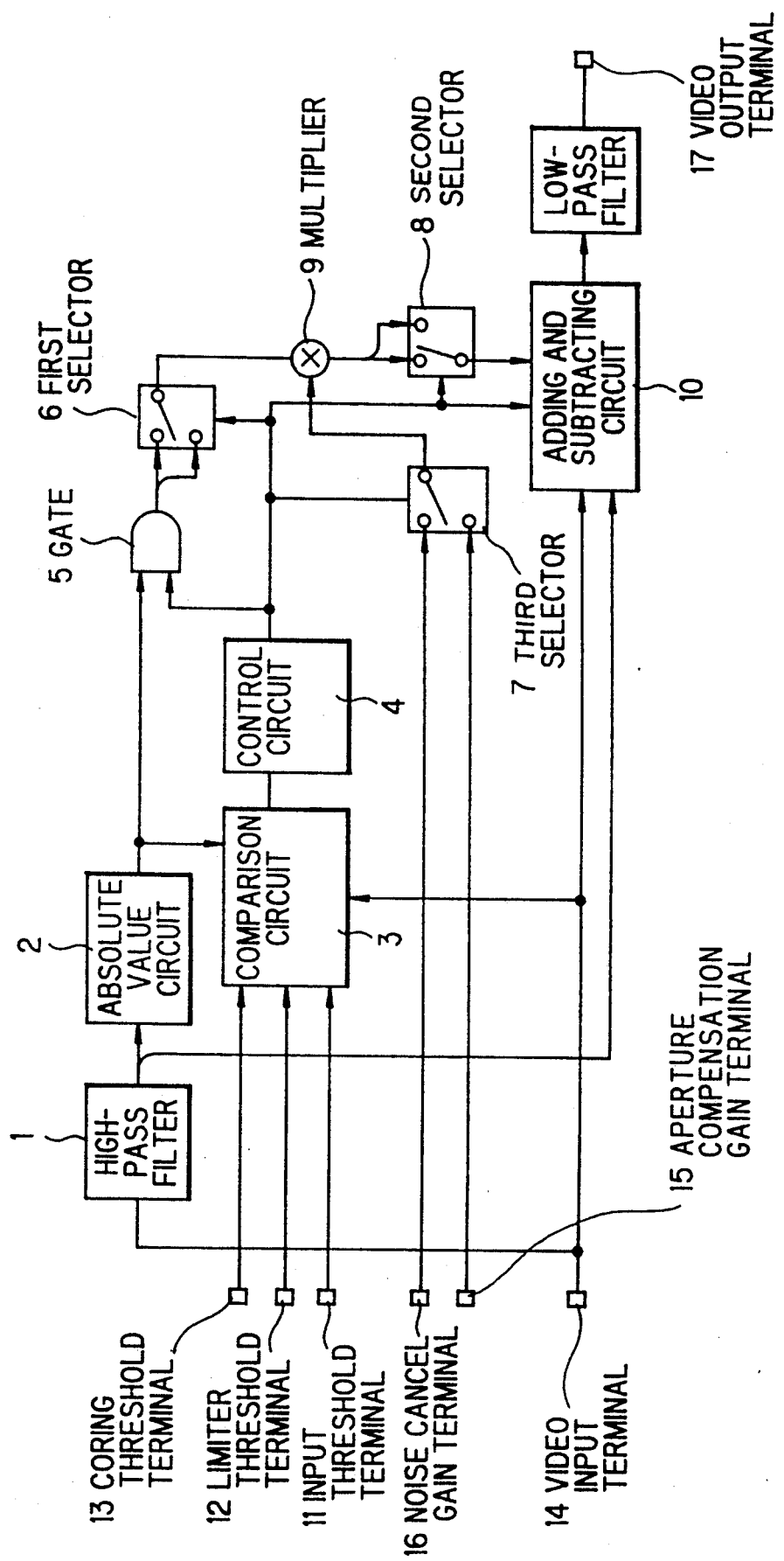
FIG. 5 is a block diagram showing an adaptive digital aperture compensation and noise cancel circuit of a second preferred embodiment according to the invention.

FIG. 5 shows an adaptive digital aperture compensation and noise cancel circuit of a second preferred embodiment according to the invention. In this second preferred embodiment, the circuit further comprises a low-pass filter 24 connected to an output of the adding and subtracting circuit 10 and the video signal output terminal 17 in addition to the circuit structure of the first preferred embodiment.

In this second preferred embodiment, an output signal of the adding and subtracting circuit 10 is supplied to an input of the low-pass filter 24, so that a high frequency component of the output video signal is attenuated to remove an unnecessary component of the video signal such as a color modulation component of a luminant signal in a CCD camera.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An adaptive digital aperture compensation and noise cancel circuit, comprising:
    means for comparison between an absolute value of a high frequency component of an input video signal and a respective one of coring and limiter threshold values, and between said input video signal and an input threshold value;
    first means for selecting a predetermined number of upper or lower bits of said absolute value in accordance with a comparison result of said comparison means;
    a multiplier for multiplying a selected upper or lower bits and one selected from an aperture compensation gain and a noise cancel gain in accordance with said comparison result;
    second means for selecting a predetermined number of upper or lower bits of a multiplied value of said multiplier in accordance with said comparison result;
    means for carrying out a calculation selected from an addition of a selected upper or lower bits of said multiplied value to said input video signal and a subtraction of said selected upper or lower bits of said multiplied value from said input video signal in accordance with a sign of said high frequency component and said comparison result of said comparison means, an output video signal being generated by said calculation.

2. An adaptive digital aperture compensation and noise cancel circuit, according to claim 1, wherein:
    said comparison means, comprises:
    a high-pass filter for providing said high frequency component of said input video signal;
    an absolute value circuit for providing said absolute value of said high frequency component;
    a comparison circuit for providing said comparison result by receiving said absolute value, and said coring, limiter and input threshold values; and
    a control circuit for providing aperture compensation, noise cancel and through control signals;
    said first and second selecting means select said upper bits in generation of said aperture compensation control signal, and said lower bits in generation of said noise cancel control signal, and hold a prior state in generation of said through control signal, respectively; and
    said calculation means carries out said addition in a case where said sign is plus and said aperture compensation control signal is generated, and said sign is minus and said noise cancel compensation control signal is generated, and said subtraction in a case where said sign is plus and said noise cancel control signal is generated, and said sign is minus and said aperture compensation control signal is generated.

3. An adaptive digital aperture compensation and noise cancel circuit, according to claim 1, further comprising:
    a low-pass filter for removing a high frequency component of said output video signal.

* * * * *